United States Patent [19]

Cruz-Uribe et al.

[11] Patent Number: 4,680,595

[45] Date of Patent: Jul. 14, 1987

[54] IMPULSE INK JET PRINT HEAD AND METHOD OF MAKING SAME

[75] Inventors: Antonio S. Cruz-Uribe, Cobalt; David W. Hubbard, Stamford; Gopalan Raman, Bethel, all of Conn.

[73] Assignee: Pitney Bowes Inc., Stamford, Conn.

[21] Appl. No.: 795,584

[22] Filed: Nov. 6, 1985

[51] Int. Cl.[4] ............ G01D 15/16

[52] U.S. Cl. ............ 346/140 R; 346/1.1

[58] Field of Search ............ 346/140, 75, 1.1

[56] References Cited

U.S. PATENT DOCUMENTS

| | | | |
|---|---|---|---|
| 3,107,630 | 10/1963 | Johnson et al. | 417/322 |
| 3,211,088 | 10/1965 | Naiman | 346/140 X |
| 3,298,030 | 1/1967 | Lewis et al. | 346/75 |
| 3,683,212 | 8/1972 | Zoltan | 346/140 X |
| 3,747,120 | 7/1973 | Stemme | 346/140 X |
| 3,946,398 | 3/1976 | Kyser et al. | 346/140 X |
| 4,189,734 | 2/1980 | Kyser et al. | 346/140 X |
| 4,216,483 | 8/1980 | Kyser et al. | 346/140 |
| 4,229,751 | 10/1980 | Tamai | 346/140 |
| 4,317,124 | 2/1982 | Shirato | 346/140 |
| 4,339,763 | 7/1982 | Kyser et al. | 346/140 |
| 4,460,906 | 7/1984 | Kanayama | 346/140 |
| 4,521,788 | 6/1985 | Kimura | 346/140 |
| 4,525,728 | 6/1985 | Koto | 346/140 |
| 4,528,575 | 7/1985 | Matsuda | 346/140 |
| 4,587,534 | 5/1986 | Saito | 346/140 |
| 4,599,628 | 7/1986 | Doring | 346/140 |
| 4,605,939 | 8/1986 | Hubbard | 346/140 |

FOREIGN PATENT DOCUMENTS 2256667 11/1972 Fed. Rep. of Germany .

*Primary Examiner*—Joseph W. Hartary

*Attorney, Agent, or Firm*—Peter Vrahotes; Melvin J. Scolnick; David E. Pitchenik

[57] ABSTRACT

An impulse ink jet print head and method of fabricating same. The print head comprises a plurality of superposed, contiguous plates including a nozzle plate with at least a pair of nozzles for ejecting ink droplets in a direction perpendicular to a plane of the plates. Another plate is a channel plate defining at least a pair of coplanar axially aligned elongated chambers, each connected to an ink supply and having an outlet communicating with an associated nozzle. A diaphragm plate overlies the channel plate and has transducers thereon for displacing ink in each of the chambers to eject discrete ink droplets from the nozzles. Other plates may include a manifold plate for directing ink to a plurality of pairs of chambers and a restrictor plate with restictor orifices positioned between the manifold plate and each of the chambers. The method of fabricating the print head includes forming the different plates, forming the transducers, and assembling all of the components in a particular relationship.

29 Claims, 10 Drawing Figures

IMPULSE INK JET PRINT HEAD AND METHOD OF MAKING SAME

BACKGROUND OF THE INVENTION

I. Field of the Invention

The present invention relates to an impulse ink jet print head comprised of a plurality of plates held together in a superposed contiguous relationship and to a method of fabricating same.

II. Description of the Prior Art

Ink jet systems, and particularly impulse ink jet systems, are well known in the art. The principle behind an impulse ink jet as embodied in the present invention is the displacement of ink and the subsequent emission of ink droplets from an ink chamber through a nozzle by means of a driver mechanism which consists of a transducer (e.g., of piezoceramic material) bonded to a thin diaphragm. When a voltage is applied to the transducer, the transducer attempts to change its planar dimensions, but because it is securely and rigidly attached to the diaphragm, bending occurs. This bending displaces ink in the chamber, causing outward flow both through an inlet from the ink supply, or restrictor, and through an outlet or nozzle. The relative fluid impedances of the restrictor and nozzle are such that the primary outflow is through the nozzle. Refill of the ink chamber after a droplet emerges from the nozzle results from the capillary action of the ink meniscus within the nozzle which can be augmented by reverse bending of the transducer. Time for refill depends on the viscosity and surface tension of the ink as well as the impedance of the fluid channels. A subsequent ejection will then occur but only when refill has been accomplished and when, concurrently, the amplitude of the oscillations resulting from the first ejection have become negligible. Important measures of performance of an ink jet are the response of the meniscus to the applied voltage and the recovery time required between droplet ejections having uniform velocity and drop diameter.

In general, it is desirable to employ a geometry that permits several nozzles to be positioned in a densely packed array. In such an array, however, it is important that the individual nozzles eject ink droplets of uniform diameter and velocity even at varying droplet ejection rates.

Some representative examples of the prior art will now be described. U.S. Pat. No. 3,107,630 to Johnson et al is an early disclosure of the use of piezoceramic transducers being utilized to produce a high frequency cyclic pumping action. This was followed by U.S. Pat. No. 3,211,088 to Naiman which discloses the concept of an impulse ink jet print head. According to Naiman, when a voltage is applied to a transducer, ink is forced through the nozzle to form a spot upon a printing surface. The density of the spots so formed is determined by the number of nozzles employed in a matrix. Another variation of print head is disclosed in U.S. Pat. No. 3,767,120 issued to Stemme which utilizes a pair of chambers positioned in series between the transducer and the discharge nozzle.

Significant improvements over the then existing prior art are disclosed in a series of patents issued to Kyser et al, namely, U.S. Pat. Nos. 3,946,398, 4,189,734, 4,216,483, and 4,339,763. According to each of these disclosures, fluid droplets are projected from a plurality of nozzles at both a rate and in a volume controlled by electrical signals. In each instance, the nozzle requires that an associated transducer, and all of the components, lie in planes parallel to the plane of the droplets being ejected.

A more recent disclosure of an ink jet print head is provided in the U.S. Pat. No. 4,525,728 issued to Koto. In this instance, the print head includes a substrate having a plurality of pressurization chambers of rectangular configuration disposed thereon. Ink supply passages and nozzles are provided for each pressurization chamber. Each chamber also has a vibrating plate and a piezoceramic element which cooperate to change the volume of the pressurization chamber to cause ink to be ejected from the respective nozzles thereof.

In many instances of the prior art, ink jet print heads are assembled from a relatively large number of discrete components. The cost of such a construction is generally very high. For example, an array of ink jets requires an array of transducers. Typically, each transducer is separately mounted adjacent to the ink chamber of each jet by an adhesive bonding technique. This presents a problem when the number of transducers in the array is greater than, for example, a dozen, because complications generally arise due to increased handling complexities, for example, breakage or failure of electrical connections. In addition, the time and parts expense rise almost linearly with the number of separate transducers that must be bonded to the diaphragm. Furthermore, the chances of a failure or a wider spread in performance variables such as droplet volume and speed, generally increase. Additionally, in many instances, prior art print heads were large and cumbersome and could accommodate relatively few nozzles within the allotted space.

SUMMARY OF THE INVENTION

It was with knowledge of the prior art and the problems existing which gave rise to the present invention. In brief, the present invention is directed towards an improved impulse ink jet print head and a method of fabricating such an improved print head. It comprises a plurality of superposed, contiguous plates including a nozzle plate with at least a pair of nozzles for ejecting ink droplets in a direction perpendicular to a plane of the plates. Another plate is a channel plate defining at least a pair of coplanar axially aligned elongated chambers, each connected to an ink supply and having an outlet communicating with an associated nozzle. A diaphragm plate overlies the channel plate and has transducers thereon for imparting a displacement of ink from each of the chambers to eject discrete ink droplets from the nozzles. Other plates may include a manifold plate for directing ink to a plurality of pairs of chambers and a restrictor plate with restrictor orifices positioned between the ink supply and each of the chambers. The method of fabricating the print head includes forming the different plates, forming the transducers, and assembling all of the components in a particular relationship.

In short, it can be said that the present invention exhibits an advantage over the Kyser et al patents by providing a print head of significantly improved compactness and reduced number of parts and over the recently issued Koto patent by providing a print head requiring a smaller number of parts.

It is therefore an object of the present invention to overcome many of the disadvantages of the various constructions and methods of manufacturing impulse ink jet print heads disclosed by the prior art.

It is another object of the present invention to provide a nozzle array of laminated construction in which each of the plates, performs one or more functions.

It is still another object of the present invention to provide the construction just described in which the laminae or plates are, variously, a diaphragm plate, a channel plate, a restrictor plate, a manifold plate, a base plate, and an orifice plate, or multiples of these.

It is yet another object of the present invention as previously set forth in which a plurality of pairs of generally coplanar axially aligned elongated chambers have relatively long sidewalls and relatively short endwalls; that the short endwalls have outlets communicating with nozzles that are proximately opposed to one another at their endwalls; further, that each of the opposed endwalls extend toward the other of the chambers in an interlaced relationship and overlap a plane transverse to the plane of the laminae or plates and contain axes of the outlets therein.

It is further object of the present invention to provide a method of manufacturing an impulse ink jet print head that is less expensive than prior art methods, specifically, a method requiring fewer parts, few assembly steps, and therefore considerably less time to produce.

It is an object of the present invention to provide a method of manufacturing a transducer array that employs a single sheet of transducer material and thereby avoids the necessity of separatly bonding individual transducers to form the transducer array.

It is a further object of the present invention to provide a method of manufacturing a transducer array wherein the transducers themselves are more uniform dimensionally and compositionally than those disclosed in the prior art, thereby resulting in much lower variations in the required drive voltages for each of the transducers.

It is a further object of the present invention to provide a method for manufacturing a transducer array wherein control of the location of each of the transducers to within a few ten thousandths of an inch is attainable; whereas, with the prior art method of placing a large number of tiny transducers individually, errors on the order of plus or minus 0.0005 inches can be expected.

It is a further object of the present invention to provide a method of manufacturing a transducer array that substantially avoids the prior art problem of breakage of the extremely fragile transducers; breakage is much more likely, unless extraordinary precautions are taken, when handling many small pieces instead of a single sheet of transducer material.

It is yet a further object of the present invention to provide a method of manufacturing a transducer array that substantially avoids the formation of internal microscopic fractures in the transducers which can lead to premature failure.

It is still a further object of the present invention to provide a method of manufacturing a transducer array that provides for producing virtually any transducer shape which can be cut from a flat sheet of material, thereby enabling optimization of output of an ink jet print head as well as compensation for ink channels having different lengths.

It is a further object of the present invention to provide an improved method of making a transducer array for use in an impulse ink jet print head from a single sheet of transducer material comprising the steps of securing a single sheet of transducer material to a diaphragm and removing a sufficient amount of the transducer material to leave a plurality of discrete portions of the transducer material extending from the diaphragm.

It is still another object of the present invention to provide a method of making a transducer array for use in an impulse ink jet print head from a single sheet of transducer material comprising the steps of coating a layer of a diaphragm material onto a single sheet of a transducer material and removing a sufficient amount of the transducer material to leave a plurality of discrete portions of the transducer material extending from the diaphragm.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of the invention, illustrate some of the embodiments of the invention and, together with the description, serve to explain the principles of the invention in general terms.

DESCRIPTION OF THE PREFERRED EMBODIMENT

Primary goals sought to be achieved in the design of an ink jet print head are reproducibility, high drop emission rate, ease of fabrication utilizing highly automated techniques, increased nozzle density, uniformity of performance among individual jets, and all of these with minimum cost. Such goals have been achieved by the present invention.

Figure 1:
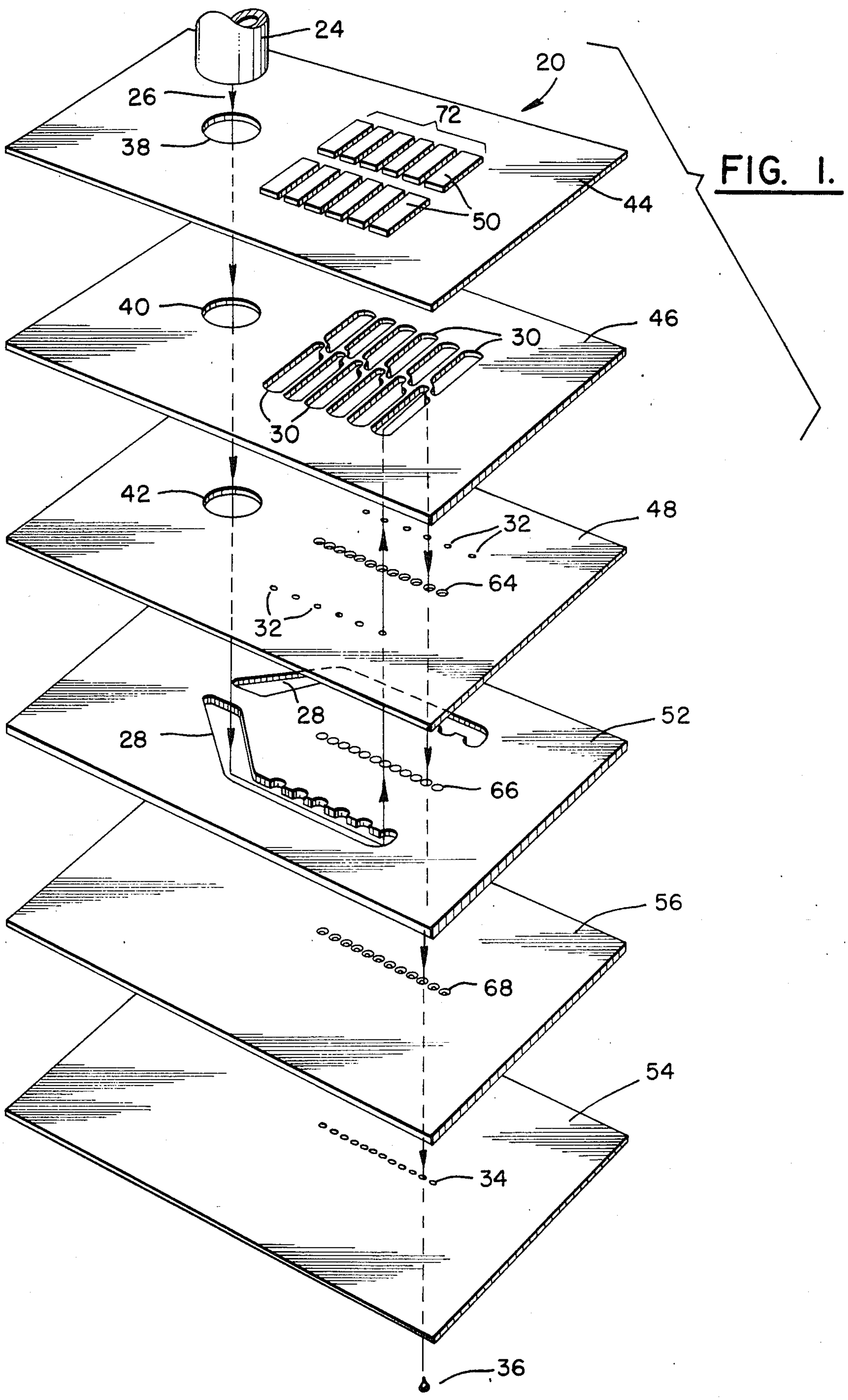
FIG. 1 is an exploded perspective view of a plurality of discrete plates employed in the construction of an ink jet print head embodying the present invention.
Figure 2:
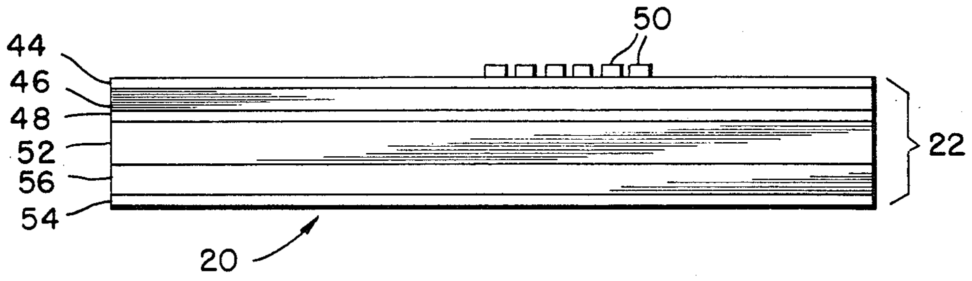
FIG. 2 is a side elevation view of the print head illustrated in FIG. 1.

Turn initially to FIG. 1 which illustrates an ink jet print head 20 generally embodying the invention. Although FIG. 1 illustrates a 12 nozzle print head, the concept of the invention can be reduced to a two nozzle configuration or can be extended to an n-nozzle array. That is, the concept of the invention can be employed for as many nozzles as desired, subject to material and size limitations. As illustrated in FIGS. 1 and 2, the print head 20 is comprised of a plurality of superposed, contiguous laminae or plates collectively represented by a reference numeral 22 (FIG. 2). Each of the plates 22 is individually fabricated and has a particular function as a component of the print head.

Figure 3:
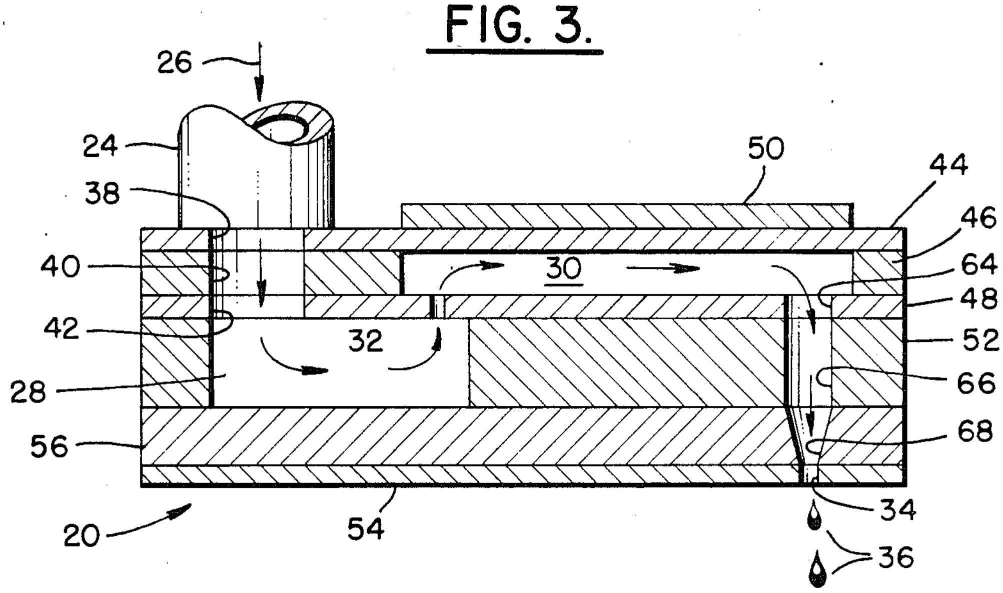
FIG. 3 is a diagrammatic cross section view illustrating the flow of ink through a print head constructed in accordance with the present invention.
Figure 5:
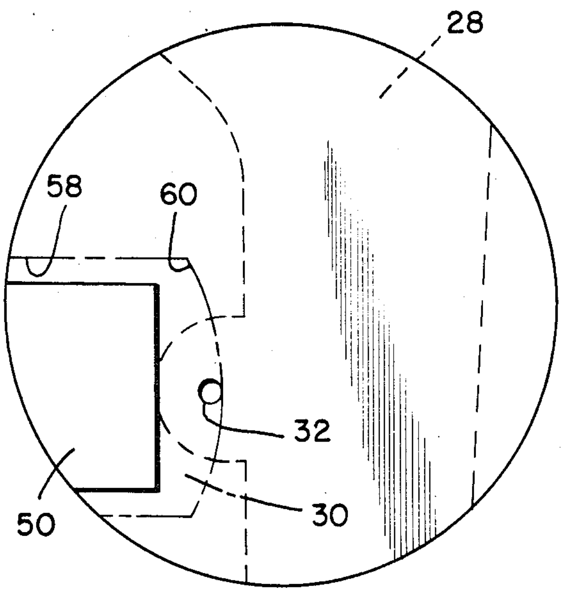
FIG. 5 is a detail top plan view illustrating, in enlarged form, a portion of FIG. 4 and specifically, the restrictor region.
Figure 6:
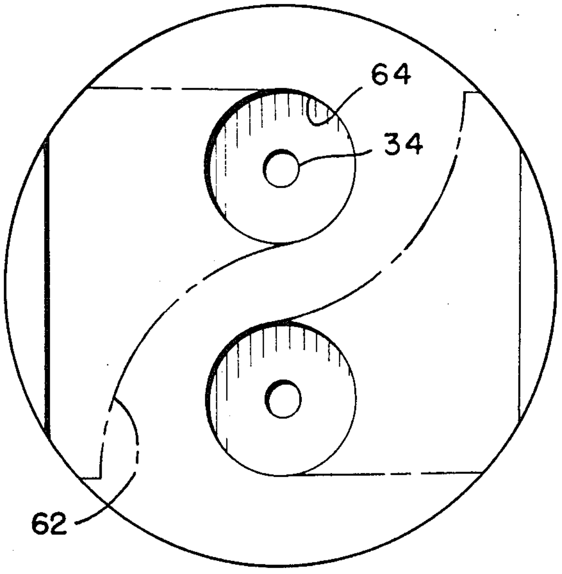
FIG. 6 is a detail top plan view illustrating, in enlarged form, another portion of FIG. 4 and specifically, the nozzle region.

FIG. 3 is a diagrammatic representation provided for the purpose of illustrating the flow of ink through one nozzle of the print head 20, but is not intended to otherwise illustrate the relative dimensions or operation of the print head 20 as shown in FIG. 1.

As particularly seen in FIGS. 1 and 3, ink enters through a feed tube 24 and continues through the print head 20 as indicated by a series of discontinuous arrowheads 26. The ink flows into a main chamber or manifold 28, then into a chamber 30 through a restrictor orifice 32, then to a nozzle 34 through which discrete ink droplets 36 are ejected. As the ink flows from the feed tube 24 to the manifold 28, it passes through aligned holes 38, 40, and 42 formed, respectively, in a diaphragm plate 44, a channel plate 46, and a restrictor plate 48.

Each of the two chambers formed in the channel plate 46 extends completely therethrough and can be formed in a suitable manner as by etching. A typical thickness for the channel plate is eight mils, but this dimension as with all of the other dimensions mentioned herein can vary considerably and still be within the scope of the invention. The roof of the chamber 30, which is the diaphragm plate 44, is typically 1 to 4 mils thick and has a transducer 50 composed of a suitable piezoceramic material mounted thereon. Upon the application of a voltage to the transducer 50, the diaphragm 44 is caused to bend into the chamber 30 thereby resulting in the displacement of the ink within the chamber. This results in ejection of a droplet from the nozzle and subsequent oscillation of the meniscus and refill of the chamber.

Two important resonant modes are associated with these motions, usually at approximately 10 to 24 kHz and 2 to 4 kHz, respectively. Provided the kinetic energy of the ink in the nozzle exceeds the surface energy of the meniscus at the nozzle 34, a droplet 36 is ejected. Sufficient energy is imparted to the droplet so it achieves a velocity of at least 2 m/sec. and thereby travels to a printing surface (not shown) proximate to the print head 20. The dimensions of the transducer 50, the diaphragm 44, the nozzle 34, the chamber 30 and the restrictor orifice 32 all influence the performance of the ink jet. Choice of these dimensions is coordinated with choice of an ink of a given viscosity. The shape of the electrical voltage pulse is also tailored to achieve the desired drop velocity, refill time, and elimination of extraneous droplets, usually referred to as satallites. A preferred diameter of the nozzle 34 is 0.002 to 0.003 inches and the ratio of the length to width of the transducers 50, which are preferably rectangular in shape, is approximately six to one.

In addition to those plates already named, the manifold 28 is formed in a manifold plate 52, the nozzle 34 is formed in a nozzle plate 54, and a base plate 56 is positioned intermediate the manifold plate 52 and the nozzle plate 54. The plates 22 comprising the print head 20 may be fabricated from stainless steel or some other alloy, or of glass, or of other suitably stiff but workable material. As appropriate, they may be held together by using adhesives, brazing, diffusion bonding, electron beam welding or resistance welding.

Figure 4:
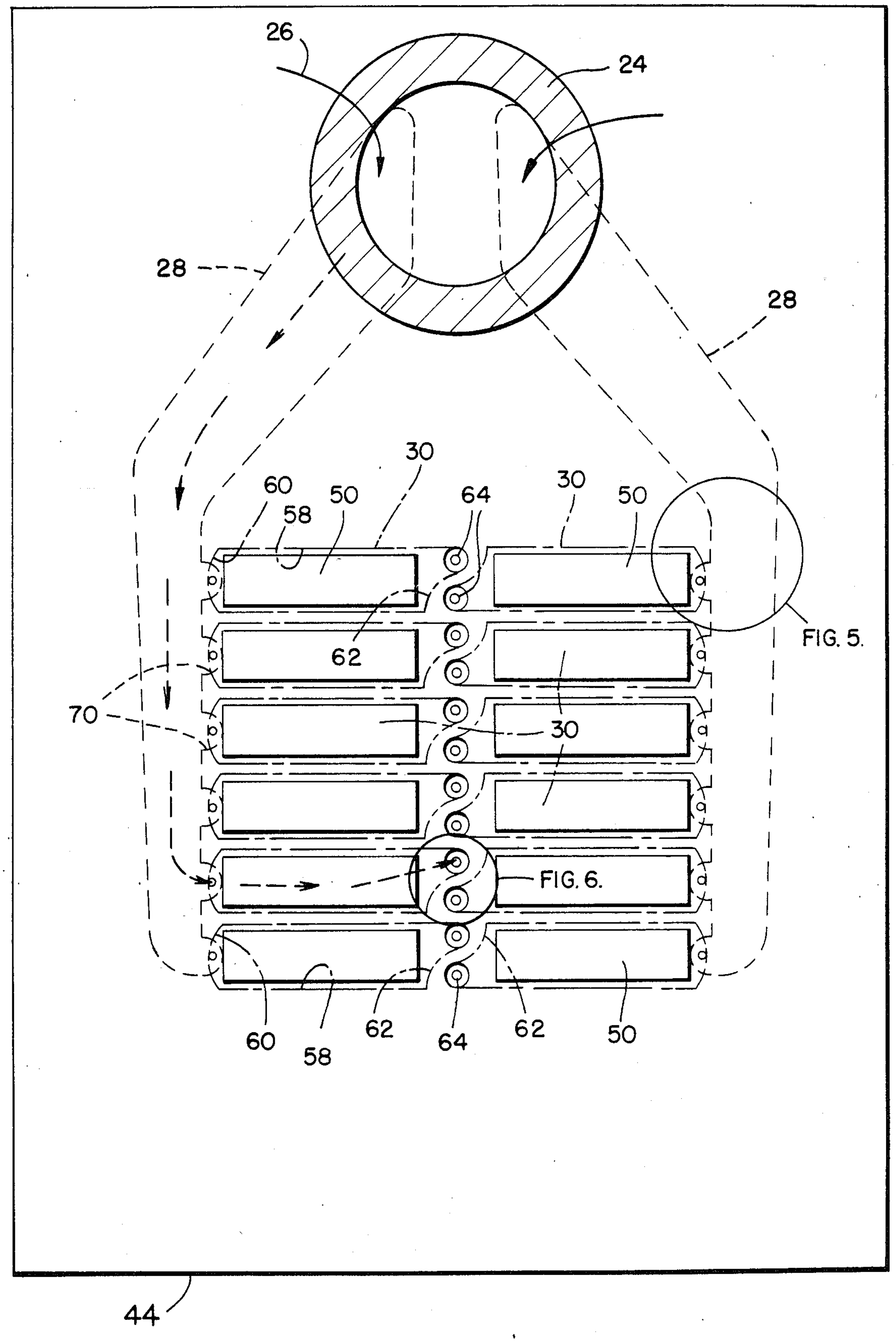
FIG. 4 is a top plan view of the print head illustrated in FIG. 1.

As best illustrated in FIG. 4, the individual chambers 30 are approximately rectangular, each having relatively long sidewalls 58 and relatively short endwalls 60 and 62. A pair of chambers 30 is axially aligned along their major axes and is proximately opposed to one another at their respective endwalls 62. As illustrated, each of the opposed endwalls 62 extends towards the other of the chambers 30 in an interlaced relationship and overlaps a plane transverse to the channel plate 46 and containing axes of outlets 64 formed in the restrictor plate 48 and leading to the nozzles 34. Connector holes 66 and tapered holes 68 are formed in the manifold plate 52 and in the base plate 56, respectively, to thereby connect each outlet 64 to an associated one of the nozzles 34. While the diameters of the outlets 64 and the connector holes 66 are approximately the same, about 12 to 16 mils in diameter, each tapered hole 68 is tapered from a 12 to 16 mil diameter at its interface with the outlet 64 to a diameter of approximately two to three mils at its interface with the nozzle 34. Each set of outlets 64, connector holes 66, tapered holes 68, and nozzles 34 are preferably axially aligned, their axes being perpendicular, or at least transverse to, the plane of the manifold plate 52. The dimensions of the connector holes 66 and of the tapered holes 68 also influence the performance of the ink jet.

A plurality of pairs of the axially aligned chambers are formed in the channel plate 46 in side by side relationship along their respective sidewalls 58. While six such pairs of chambers 30 are illustrated in FIG. 4 connected to 12 associated nozzles 34, it will be appreciated that the arrangement described can be utilized for as few as two nozzles or as many as reasonably desired. By reason of the interlaced relationship of the endwalls 62 and their associated outlets 64 and nozzles 34, a high density of the nozzles can be achieved while assuring the proper size of chamber 30 for the ejection of the droplets 36 from the nozzle 34. In a typical construction, the distance between centers of the nozzles is between 0.02 inches and 0.03 inches.

The restrictor plate 48 separates the chambers 30 from the ink supply manifolds 28. Whereas the diaphragm plate 44 serves as the roof for the chambers 30, the restrictor plate 48 serves as the undersurface of the chambers. A typical thickness for the restrictor plate is 2 to 4 mils. The restrictor orifices 32 formed in a restrictor plate 48 are typically slightly smaller in diameter than the nozzles 34. This assures, upon actuating the transducer 50, greater flow of the ink through the nozzle 34 rather than back to the manifold 28. It will be appreciated that in order for the individual nozzles 34 in an array such as that provided by the print head 20 to exhibit a minimum and acceptable variation in performance, it is necessary that the restrictors 32 also be of uniform size. While the restrictor orifices 32 can be formed in a number of ways, such as by drilling or electroforming using masks, it has been found that greatest accuracy and uniformity is achieved by means of punching.

As in the instance of the chambers 30 formed in the channel plate 46, the manifolds 28 formed in the manifold plate 52 can be formed in a suitable manner as by etching and extend completely through the thickness of the plate, which is typically about 20 mils thick. As seen in FIGS. 1 and 4, a pair of manifolds 28 are formed in the plate 52 and extend from relatively broad ends at which they are in communication with the feed tube 24 to narrowed regions having a plurality of dimpled portions 70, each of which underlies an associated restrictor orifice 32. As seen particularly in FIGS. 1 and 3, the restrictor plate serves as the roof for the manifolds 28 and the manifold plate 22. In a similar manner, the base plate 56, which is typically about 20 mils thick, serves as the undersurface for the manifolds 28 and to stiffen the structure of the print head.

There may also be instances in which it is desirable to completely eliminate the base plate 56. In such an event, the orifice plate would serve as the undersurface for the manifolds 28 and the outlet connector holes 66 would be tapered in the manner of the tapered holes 68.

The nozzle plate 54, as best seen in FIG. 1, is formed with a row of nozzles 34 therein aligned with the outlets 64, connector holes 66, and tapered holes 68 when the print head 20 is fully assembled. While the nozzles 34 can be formed according to a number of suitable techniques, punching is a preferred technique for insuring uniformity as well as accuracy within close tolerance limitations. The operation of the print head in ejecting the droplets 36 may be further improved by tapering the nozzles 34 as well as the tapered holes 68.

Figure 7:
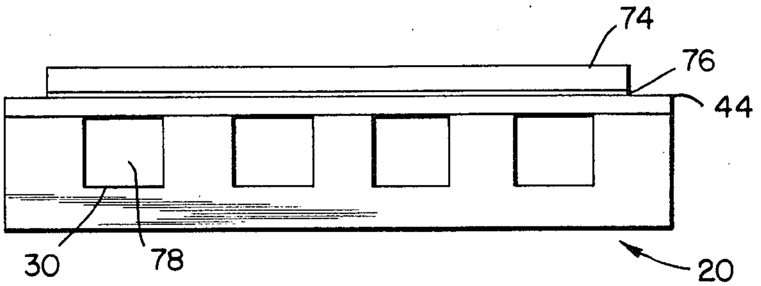
FIG. 7 is a cross sectional diagram illustrating a single sheet of a transducer material bonded to an ink jet array.

Referring now to FIGS. 1 and 7, a transducer array 72 comprising a plurality of the individual transducers 50 utilized in the impulse ink jet print head may be produced in accordance with the present invention by starting with a single sheet of transducer material, preferably and hereinafter referred to, as a piezoceramic material 74. In one embodiment the single sheet of piezoceramic material 74 is bonded by an adhesive layer 76, preferably composed of an epoxy or low temperature solder, to the diaphragm plate 44 in direct contact over the area of ink 78 in each of the compression chambers 30. The adhesive employed in the present invention to bond the piezoceramic material to the diaphragm should preferably be applied so as to be uniform in thickness, have a high Young's modulus and assure consistent electrical contact between the diaphragm and the piezoceramic material. The thickness of the diaphragm material ranges between 0.001 and 0.005 inches. However, when non-conducting adhesives are employed, there must be intimate contact between portions of the diaphragm and portions of the transducer material to assure electrical continuity with the adhesive material filling the remaining interstices. In any event, the diaphragm has a comparable stiffness to the piezoceramic material.

In accordance with the present invention, a permanent polarization of the piezoceramic material 74 is preferably carried out prior to bonding this material to the diaphragm plate 44, i.e., poling of the piezoceramic material. The poling process can be achieved by applying a d.c. voltage to the piezoceramic material in excess of the saturation field of the piezoceramic material, i.e., 65–100 volts/mil.

Figure 8:
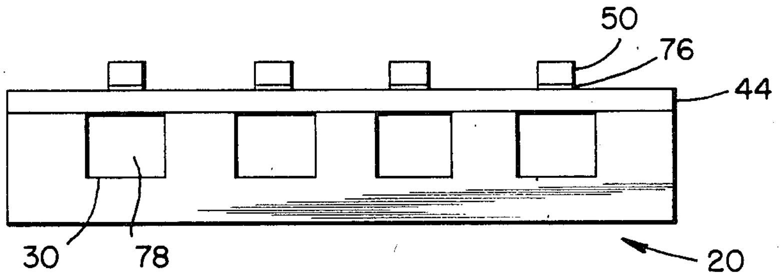
FIG. 8 is a cross sectional diagram illustrating a transducer array formed in accordance with the method of this invention including a plurality of discrete islands of the transducer material.

Thereafter a sufficient amount of the piezoceramic material 74 is removed to form a plurality of discrete portions of the piezoceramic material extending from the diaphragm plate. In the impulse ink jet print head 20 these discrete portions, the resulting individual transducers 50, are positioned over the chambers 30. In accordance with the present invention the amount and location of the piezoceramic material (including adhesive) that is removed can vary, and thereby result in different configurations for the transducer array 72. For example, and as shown in FIG. 8, a sufficient amount of piezoceramic material 74 is removed to form a plurality of discrete islands, i.e. individual transducers 50, of piezoceramic material bonded to the diaphragm plate 44 in areas directly over each associated chamber 30.

Figure 9:
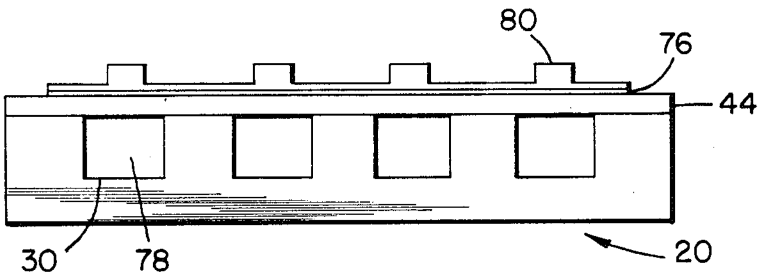
FIG. 9 is a cross sectional diagram illustrating a transducer array formed in accordance with the method of the present invention having a plurality of discrete portions of transducer material without total penetration of the transducer material.

During the process of removing piezoceramic material, care must be taken to avoid even slightly damaging the diaphragm which may be as thin as 0.001 inches. One way to minimize the chances of harming the diaphragm, is to avoid completely penetrating the piezoceramic material during the removal procedure. As shown in FIG. 9, this can be accomplished by removing only a sufficient amount of piezoceramic material to form a plurality of discrete portions 80 of piezoceramic material without totally penetrating the thickness of this material. Once again, these discrete portions 80 are formed in an area directly over the associated chambers. The stiffness of the remaining piezoceramic material over the ink chambers 30 where the processing of the ink occurs is not enough to affect the bending of the transducer and diaphragm materials, and therefore not enough to affect the displacement needed to drive the ink 78 out of its chamber 30 and through the nozzle 34 of the ink jet print head 20.

In many instances it may be preferred to mechanically strengthen the islands or discrete portions of piezoceramic material that is left after the process step of removing the transducer material for the purpose of decreasing the chances of having these transducer portions fail due to fracturing or fatigue. This is accomplished in accordance with the present invention and as shown in FIG. 10, by providing a smooth mechanical transition 82 at the boundary between a remaining portion 84 of the piezoceramic material and the diaphragm plate 44.

According to the method just described, a single sheet of transducer material is bonded to a diaphragm plate using an adhesive. If the adhesive could be eliminated, it would be possible to increase energy transfer since the adhesive layer can absorb mechanical energy. Another problem area that would thereby be avoided involves the failure of the adhesive layer to be penetrated so that electrical contact with the diaphragm plate is achieved. The resulting capacitive layer will diminish the electrical field in the piezoceramic, thus reducing the bending effect.

Accordingly, viewing again FIG. 7, in a preferred embodiment the single sheet of piezoceramic material 74 is first coated with a diaphragm material without the presence of the adhesive layer 76. As in the previous embodiment, the resulting diaphragm plate 44 is then incorporated into the ink jet print head 20 so as to be in direct contact over the area of the ink 28 in each of the chambers 30. The diaphragm plate 44 can be, for example, a metal or alloy and may be as thin as 0.001 inches. In any event, the diaphragm plate is preferably formed of a material having a comparable stiffness to the piezoceramic material to thereby enable both the diaphragm and the piezoceramic material to bend when the transducer expands or contracts due to an applied voltage. The coating step is preferably achieved by electrodepositing a diaphragm material on one face of the piezoceramic sheet. The surface of the piezoceramic sheet should have a flash of a material which will enable the efficient electroplating of a metal (e.g., nickel) onto the piezoceramic material.

Figure 10:
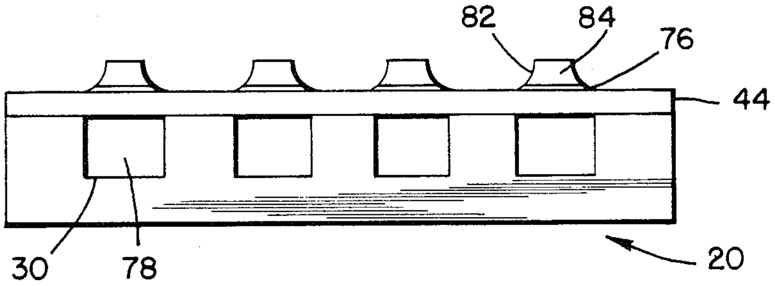
FIG. 10 is a cross sectional diagram illustrating a further embodiment of a transducer array formed by the method of the present invention.

The removal of transducer material to form any of the above described examples of discrete portions of transducer material as illustrated in FIGS. 8 through 10 can, in accordance with the present invention be accomplished by a variety of procedures. For example, one procedure that can be used involves chemical etching. Various types of acid solutions (e.g., solutions containing hydrofluoric acid, phosphoric acid, fluoroboric acid, sulphuric acid, nitric acid or hydrochloric acid) can be used to dissolve most of the piezoceramic matrix. Any residue can be rinsed or otherwise mechanically removed. To obtain a specific etch pattern, a mask may be formed by uniformly coating the piezoceramic with a polymer such as a photoresist and selectively dissolving sections of the polymer after ultraviolet light exposure through a photographically prepared mask. The remaining polymer is unaffected by the etchant used to dissolve the piezoceramic material. After removal of the unwanted piezoceramic, the remaining photoresist is dissolved. The specific depth of the chemical etch is determined by exposure time, temperature, concentration of the etchant and mechanical agitation. Using, for example, a piezoceramic material formed of a mixture of PbO, $ZrO_2$, $TiO_2$ and dopants, chemical etching to form discrete portions of piezoceramic material in accordance with the present invention has been accomplished with an acid solution of 10 ml. of HCl (specific gravity 1.19) and 3 ml. of HF (40%, solution) at room temperature for periods of time up to about 3 hours. Another process for removing piezoceramic material is laser scribing wherein continuous or pulsed lasers may be used to vaporize the unwanted sections of piezoceramic. The laser or the piezoceramic transducer is positioned mechanically under the control of the preprogrammed microprocessor.

Many factors affect the ablation rate including laser output, atmosphere, focusing of laser, exposure time, gas assist, heat dissipation mechanisms, refractory nature of the specific piezoceramic, the effective emmissivity of the piezoceramic, and the absorption of light. Care must be taken not to thermally stress the piezoceramic adjacent to the ablated region. Transducer arrays were made in accordance with this technique using a laser scribing procedure in which (a) Nd:YAG lasers were used; (b) both a continuous wave mode and a high frequency pulse (e.g., 5-10 kHz) modes were employed; (c) a scan speed of about 3 inches/sec. was used; (d) the procedure was tried with and without an aperture; and (e) both single and multiple passes were employed. Another technique that can be used for removing piezoceramic material is use of an abrasive gas jet which is computer controlled. In this technique, a stream of fine particles (e.g., alumina) is shot through a tiny nozzle with high pressure gas to abrade away piezoceramic material in a controlled fashion. This technique is preferred because it is dry and introduces the least number of defects into the piezoceramic material. As with a laser, the cutting location is determined mechanically. Control parameters include exposure time, speed and density of particles, particle type, standoff distance, and the details of particle flow.

Still other techniques that can be used for removing the transducer material in accordance with the present invention include ultrasonic machining and saw cutting in which a diamond saw with a narrow kerf, such as used to dice silicon wafers, can cut out sections of the piezoceramic material. The saw cutting technique is generally limited to straight line cuts. Ultrasonic machining employs a slurry of fine abrasive, such as for example, 600 grit boron carbide. The tool used can have any pattern, e.g. circles, rectangles, etc. The cutting tool vibrates over a small amplitude at high frequency, typically 20 kHz. The cutting motion can be precisely controlled and produces little force on the workpiece. Thus, very thin sheets of transducer material can be gently machined to close tolerance.

Thus, the invention as disclosed herein, provides for a greatly simplified design of an ink jet print head utilizing a plurality of plates of laminae resulting in ease of fabrication, while preserving uniformity of sizes for the restrictor orifices and nozzles as well as increased nozzle density by reason of the interlacing arrangement of the nozzles and their associated chambers. Emphasis also has been placed on the advantages of the accuracy of formation, ease of manufacture, and reproducibility of the transducers utilized with the print head of the invention.

While the preferred embodiments of the invention have been disclosed in detail, it should be understood by those skilled in the art that various modifications may be made to the illustrated embodiments without departing from the scope as described in the specification and defined in the appended claims.

We claim:

1. An impulse ink jet print head comprising:

a plurality of operating plates held together in a superposed relationship including at least:

a first plate including a pair of proximately disposed nozzles therein for ejecting droplets of ink therethrough;

a second plate defining a pair of generally coplanar elongated ink chambers having relatively long sidewalls and relatively short endwalls, said chambers being axially aligned along their major axes and proximately opposed to one another at their said endwalls, each of said chambers connected to an ink supply and having an outlet for directing ink toward an associated one of said nozzles in said first plate;

each of said nozzles having a central axis extending transversely of the planes of said plates and intersecting said second plates at proximate extremities of each of said chambers;

said plates having passage means connecting each of said nozzles with an associated one of said outlets, the passage means associated with each of said chambers being proximately disposed; and a third plate contiguous with said second plate and including driver means for displacing ink in each of said chambers thereby causing the ejection of ink droplets from each of said nozzles.

2. An impulse ink jet print head as set forth in claim 1 wherein said plurality of operating plates includes:

a fourth plate contiguous with said second plate having a pair of restrictor orifices therein, each of said restrictor orifices positioned intermediate the ink supply and an associated one of said chambers, each of said restrictor orifices being smaller in size than each of said nozzles.

3. An impulse ink jet print head as set forth in claim 1 wherein each of said opposed endwalls extends toward the other of said chambers in an interlaced relationship and overlaps a plane transverse to said second plate and contains axes of the outlets from said chambers and axes of both of said nozzles.

4. An impulse ink jet print head as set forth in claim 3 wherein the transverse plane is perpendicular to the major axes of said chambers.

5. An impulse ink jet print head as set forth in claim 1 wherein said outlets and their associated said nozzles are aligned on an axis perpendicular to the plane of said chambers.

6. An impulse ink jet print head comprising:

a plurality of operating plates including at least:

a first plate including a plurality of proximately disposed nozzles therein for ejecting droplets of ink therethrough;

a second plate defining a plurality of pairs of generally coplanar elongated chambers having relatively long sidewalls and relatively short endwalls, said chambers being axially aligned along their major axes and proximately opposed to one another at their said endwalls, pairs of said chambers being in side by side relationship along their respective said sidewalls;

each of said chambers connected to an ink supply and having an outlet for directing it toward an associated one of said nozzles in said first plate;

each of said nozzles having a central axis extending transversely to the planes of said plates and intersecting said second plates at proximate extremities of each of said chambers;

said plates having passage means connecting each of said nozzles with an associated one of said outlets, the passage means associated with each of said pair of chambers being proximately disposed;

a third plate proximate to said second plate and including drive means for displacing ink in each of said chambers thereby causing the ejection of ink droplets from each of said nozzles.

7. An impulse ink jet print head as set forth in claim 6 wherein said plurality of operating plates includes: a fourth plate contiguous with said second plate having a pair of restrictor orifices therein, each of said restrictor orifices positioned intermediate the ink supply and an associated one of said chambers, each of said restrictor orifices being smaller in size than each of said nozzles.

8. An impulse ink jet print head as set forth in claim 6 wherein said chambers are generally rectangular in shape and wherein said driver means includes a generally rectangular piezoceramic transducer fixed on said third plate so as to be generally coextensive with each of said chambers.

9. An impulse ink jet head as set forth in claim 8 wherein said plurality of operating plates includes: a fourth plate contiguous with said second plate having a pair of restrictor orifices therein, each of said restrictor orifices positioned intermediate the ink supply and an associated one of said chambers, each of said restrictor orifices being similar in size to each of said nozzles.

10. An impulse ink jet print head as set forth in claim 7 wherein each of said opposed endwalls extends toward the other of said chambers in an interlaced relationship and overlaps a plane transverse to said second plate and contains axes of the outlets from said chambers and axes of both of said nozzles.

11. An impulse ink jet print head as set forth in claim 10 wherein said plurality of operating plates includes:

a fifth plate having a pair of manifolds therein connected to an ink supply;

said chambers being arranged in two parallel rows, one of said rows located to one side of said transverse plane, the other of said rows located to the opposite side of said plane;

one of said manifolds connected to said restrictor orifices located to one side of said transverse plane, the other of said manifolds connected to said restrictor orifices located to the other side of said transverse plane.

12. An impulse ink jet printing head as set forth in claim 7 wherein the axes of said restrictor orifices, of said outlets, and of said nozzles are all perpendicular to the plane of said chambers.

13. A method of making an impulse ink jet print head comprising the steps of:

(a) forming in a channel plate a pair of generally coplanar elongated chambers having relatively long sidewalls and relatively short endwalls and having outlets therefrom, the chambers being axially aligned along their major axes and proximately opposed to one another at their endwalls;

(b) positioning a diaphragm plate proximate to one side of the channel plate;

(c) securing a single sheet of transducer material to the diaphragm plate;

(d) removing a sufficient amount of the transducer material to leave discrete portions of the transducer material extending from the diaphragm plate so as to overlie each of the chambers;

(e) forming a pair of spaced apart nozzles in a nozzle plate, each nozzle being perpendicular to a plane of the nozzle plate;

(f) positioning the nozzle plate proximate to a side of the channel plate opposite the diaphragm plate; and (g) assembling all of the plates so that they are held together in a superposed contiguous relationship with each of the nozzles being in communication with an associated one of the chambers.

14. A method as set forth in claim 13 wherein the diaphragm is formed of a material having a stiffness comparable to said transducer material.

15. A method as set forth in claim 13 wherein step (d) is achieved by a chemical etching process.

16. A method as set forth in claim 13 wherein step (d) is achieved by a laser scribing process.

17. A method as set forth in claim 13 wherein step (d) is achieved by an abrasive gas jet process.

18. A method as set forth in claim 13 wherein step (d) is achieved by an ultrasonic machining process.

19. A method as set forth in claim 13 wherein step (d) is achieved by a saw cutting process.

20. A method as set forth in claim 13 wherein said transducer material is a piezoceramic material.

21. A method as set forth in claim 13 wherein step (a) includes the step of:

(h) forming the pair of chambers such that each of the opposed endwalls extends toward the other of the chambers in an interlaced relationship and overlaps a plane transverse to the plane of the second plate and contains axes of the outlets.

22. A method of making an impulse ink jet print head comprising the steps of:

(a) forming in a channel plate a pair of generally coplanar elongated chambers having relatively long sidewalls and relatively short endwalls and having outlets therefrom, the chambers being axially aligned along their major axes and proximately opposed to one another a their endwalls;

(b) coating a layer of a diaphragm material onto a surface of a single sheet of a transducer material to thereby form a diaphragm plate;
(c) positioning the diaphragm plate proximate to one side of the channel plate;
(d) removing a sufficient amount of the transducer material to leave discrete portions of the transducer material extending from the diaphragm so as to overlie each of the chambers;
(e) forming a pair of spaced apart nozzles in a nozzle plate, each nozzle being perpendicular to a plane of the nozzle plate;
(f) positioning the nozzle plate proximate to a side of the channel plate opposite the diaphragm plate; and
(g) assembling all of the plates so that they are held together in a superposed contiguous relationship with each of the nozzles being in communication with an associated one of the chambers.

23. A method as set forth in claim 22 wherein the diaphragm is formed of a material having a stiffness comparable to said transducer material to enable both the diaphragm and the transducer to bend when the transducer contracts or expands.

24. A method as set forth in claim 22 wherein step (d) is achieved by a chemical etching process.

25. A method as set forth in claim 22 wherein step (d) is achieved by a laser scribing process.

26. A method as set forth in claim 22 wherein step (d) is achieved by an abrasive gas jet process.

27. A method as set forth in claim 22 wherein step (d) so achieved by an ultrasonic machining process.

28. A method as set forth in claim 22 wherein step (d) is achieved by a saw cutting process.

29. A method as set forth in claim 22 wherein said transducer material is a piezoceramic material.

* * * * *